United States Patent [19]

Jimenez et al.

[11] 4,171,198
[45] Oct. 16, 1979

[54] MATERIAL EXTRUDING APPARATUS

[75] Inventors: James A. Jimenez, Temple City, Calif.; Alfred A. Aguirre, 15353 Hayford St., La Mirada, Calif. 90638; Apolonio Reyes, 6209 Here Ford Dr., Los Angeles, Calif. 90022

[73] Assignees: Alfred A. Aguirre; Apolonio Reyes, both of Norwalk, Calif.

[21] Appl. No.: 829,292

[22] Filed: Aug. 31, 1977

[51] Int. Cl.² ............................................. B29F 3/04
[52] U.S. Cl. ................................ 425/377; 264/176 R; 425/380; 425/467
[58] Field of Search .................... 264/176 R; 425/200, 425/207, 209, 376 R, 380, 467, 363, 374, 223, 377

[56] References Cited
U.S. PATENT DOCUMENTS

| 2,899,704 | 8/1959 | Pekarek | 425/200 X |
| 2,969,026 | 1/1961 | Genich | 425/376 R X |
| 3,178,769 | 4/1965 | Lorenian | 264/176 R |

*Primary Examiner*—Mark Rosenbaum
*Attorney, Agent, or Firm*—James E. Brunton

[57] ABSTRACT

An apparatus for continuously extruding pliant material into thin sheets. Rather than following the standard approach of using cooperating rollers to extrude the material, in the apparatus of the present invention, the material is extruded through the cooperative interaction of a multi-sided rotor mechanism and a reciprocating barrier member. This arrangement overcomes many of the drawbacks inherent in extrusion devices of standard design including the undesirable tendency of the material being extruded to tenaciously adhere to the rollers after extrusion.

11 Claims, 3 Drawing Figures

MATERIAL EXTRUDING APPARATUS

BACKGROUND OF THE INVENTION

1. Field of the Invention

The present invention relates generally to material extruding apparatus and, more particularly, to sheeting extruders adapted to form pliant materials such as edible doughs into thin, continuous sheets.

2. Discussion of the Prior Art

Various types of sheeting apparatus for extruding pliant materials have been suggested. Typically, these devices embody one or more sets of cooperating rollers between which the material is passed to form it into thin sheets. Apparatus of this character has several inherent drawbacks. In the first place, the roller assemblies are generally quite expensive and are easily damaged. Additionally, certain types of materials, as for example, edible corn or wheat flour doughs, tend to adhere to the rollers and tenaciously resist separation therefrom, after the material has been sheeted or extruded. When these types of materials are being worked, therefore, the rollers must be specifically treated and mechanical means provided for separating the extruded materials from the rollers. Such expedients are often costly and frequently fail to perform in a reliable fashion. For example, the common technique used to separate the extruded material from the rollers is to position the small diameter wire in close proximity with the surface of the rollers in such a manner that the wire will urge separation of the material by a wedging action. When a fragile material is being extruded, however, the use of these stripper wires often tears the material or otherwise damages it. When this happens, the apparatus must be immediately shut down so that the damaged material can be cleared. Otherwise, a clogging of the machine will result. This is time consuming, costly, and highly undesirable.

The apparatus of the present invention successfully overcomes most of the drawbacks of the prior art devices. Since, in the apparatus of the present invention, extrusion is not accomplished in the standard manner using cooperating rollers, the problems inherent in separating the material from the rollers is avoided. As will be better understood from the description which follows, in the apparatus of the present invention, the pliant material is extruded in a highly novel manner through the cooperative interaction of a multi-sided rotor mechanism and a reciprocating bladelike barrier member.

Although the apparatus of the present invention can successfully be used to extrude various materials, it is particularly useful in sheeting edible doughs of the types used in preparing various food items. For example, the apparatus is particularly well suited for sheeting masa dough which is used in the production of tortillas. The masa dough is quite fragile and has a tendency to tenaciously adhere to rollers of the type used in prior art sheeting devices. Since extrusion rollers are not used in the apparatus of the present invention, the problems of separating the fragile material from the rollers without tearing or otherwise damaging it, are completely avoided.

SUMMARY

It is an object of the present invention to provide a device for continuously extruding pliant material into thin sheets in which even the most fragile types of material can be extruded without damaging the material.

It is another object of the invention to provide a device of the aforementioned character which can be operated continuously and automatically to precisely form the pliant materials into sheets of reproducible thickness.

It is another object of the invention to provide a device as described in the preceeding paragraph which is highly reliable in operation and which is adapted to extrude large quantities of material at a rapid rate.

It is a further object of the invention to provide an apparatus of the character described, which includes a cooperating conveyor system for continuously carrying the extruded material forwardly of the apparatus toward cooperating, processing apparatus, such as material cutters and the like.

It is yet another object of the invention to provide an extruder of the class described which is ideally suited for extruding fragile and sticky edible doughs, such as masa and the like.

These, and other objects of the invention are realized by a material extruding apparatus, comprising a material receiving hopper having side walls interconnected by a curved bottom wall, one of said side walls having a slot formed therein; a rotor mounted for rotation within said hopper, the rotor having at least three interconnected side walls, defining at their juncture at least three edge portions, the rotor being positioned within the hopper so that the edge portions thereof continuously sweep along the bottom wall of the hopper as the rotor rotates; a cam member rotatably mounted adjacent the hopper; and, a reciprocally movable follower member, extending from outside the hopper through the slot and into the hopper, one end of the follower member being operably interconnected with the cam and the other end thereof being maintained by rotation of the cam in continuous close proximity with the side walls of the rotor as the rotor rotates.

DESCRIPTION OF ONE EMBODIMENT OF THE INVENTION

Figure 1:
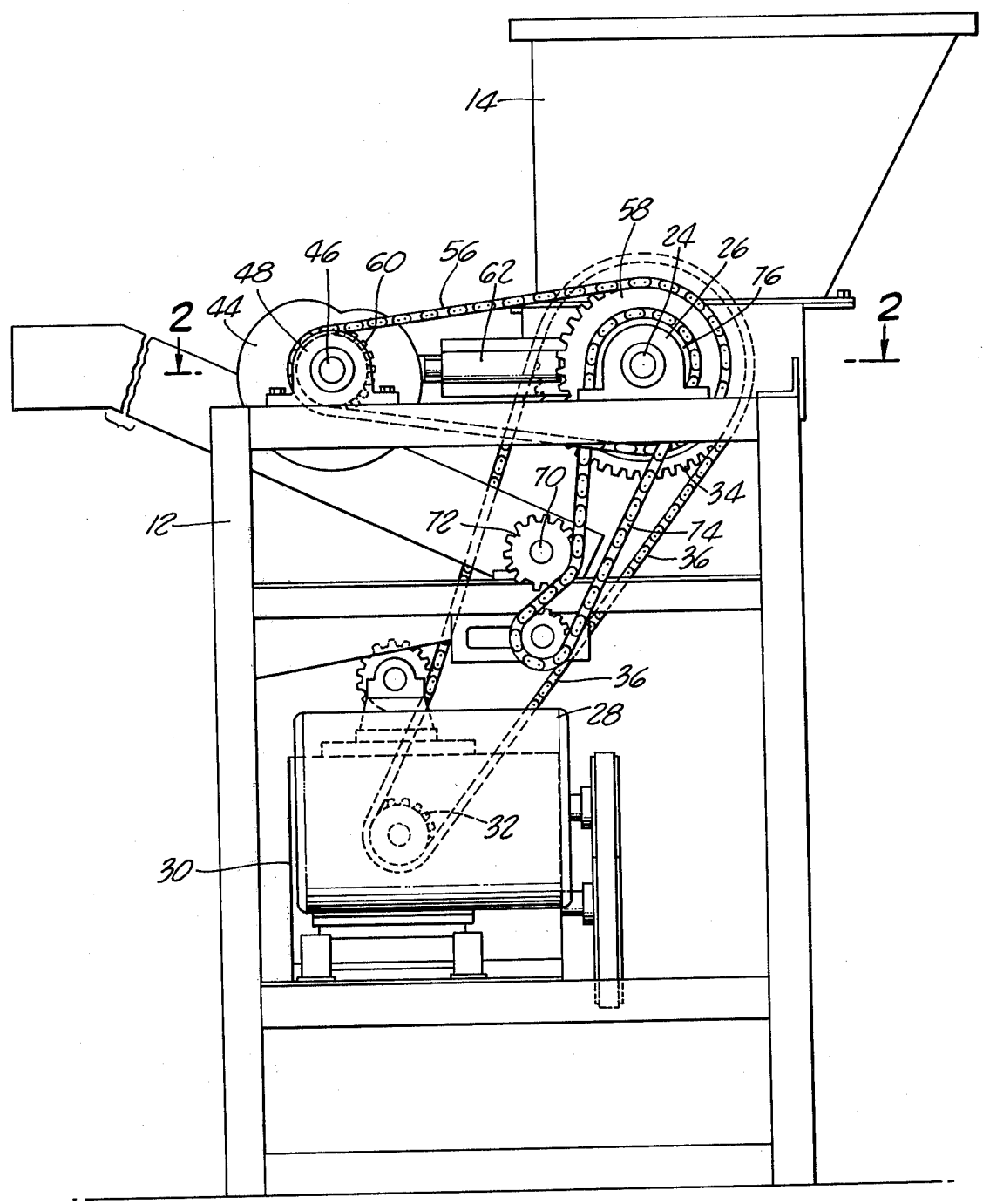
FIG. 1 is a side elevational view of the material extruding apparatus of the invention.
Figure 3:
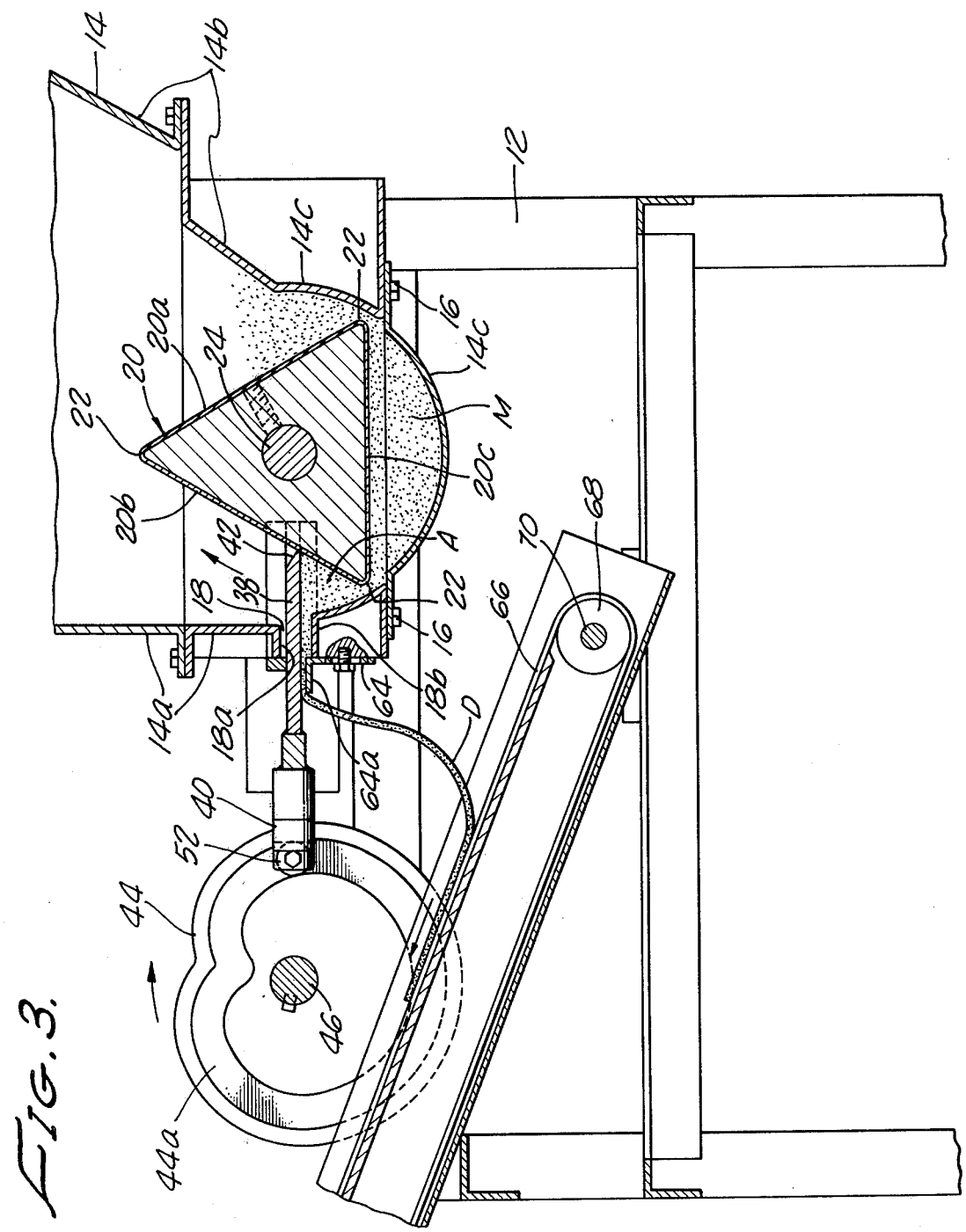
FIG. 3 is a cross-sectional view taken along lines 3—3 of FIG. 2 illustrating the construction and arrangement of various component parts of the apparatus.

Referring to the drawings and particularly to FIGS. 1 and 3, the material extruding apparatus of the invention comprises a supporting frame 12 upon which is mounted a material receiving hopper 14. As best seen in FIG. 3, hopper 14 comprises spaced apart side walls 14a and 14b and a curved bottom wall 14c interconnecting the side walls. In the form of the invention shown in the drawings the curved bottom portion of hopper 14 is fabricated in two parts which are interconnected by fasteners 16. Provided in side 14a immediately above the curved bottom wall portion 14c is a transversely extending slot 18. Slot 18 extends the entire width of hopper 14, its margins being defined by parallel flanges 18a and 18b.

Figure 2:
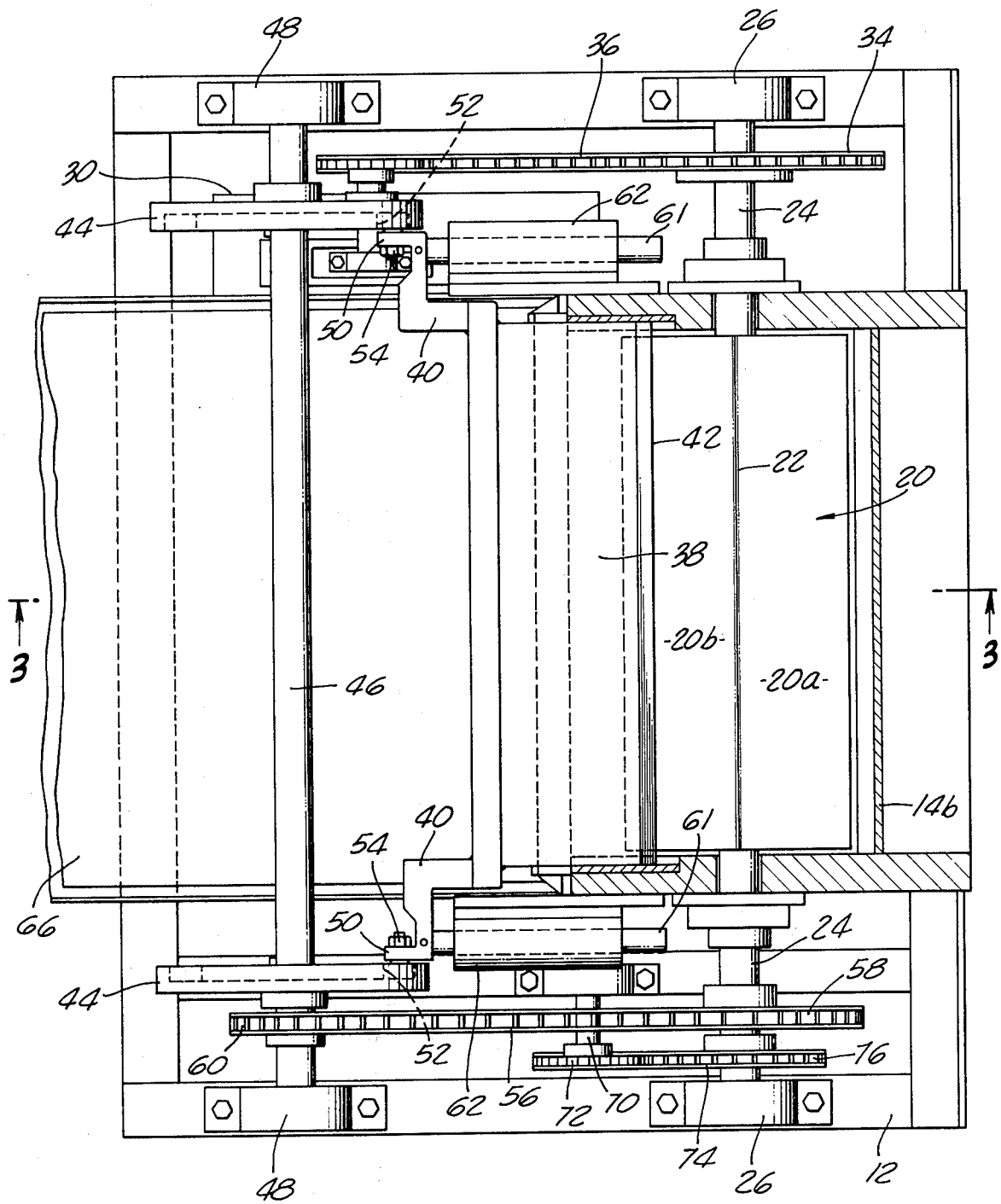
FIG. 2 is a plan view of the apparatus taken along lines 2—2 of FIG. 1.

Rotatably mounted within hopper 14 is means for moving the material within the hopper, shown here in the form of a rotor 20. In this embodiment of the invention rotor 20 is substantially triangular in cross section having three interconnected side walls 20a, 20b, and 20c, defining at their juncture three edge portions 22 (FIG. 3). Rotor 20 is positioned within hopper 14 so that as the rotor rotates the edge portions 20 sweep along the curved bottom wall 14c of the hopper in close proximity therewith. With this construction, as the rotor rotates, the material "M" within the hopper is urged in the direction of rotation of the rotor, or to the left and upwardly, as viewed in FIG. 3. It is to be understood that rotor 20 need not be triangular in cross section but may have more than three sides defining edge portions, which edge portions are adapted to sweep along the curved bottom wall of the hopper. Referring to FIGS. 1 and 2, rotor 20 is mounted on a transversely extending shaft 24 which is carried by frame 12 for rotation within suitable bearings 26.

Shaft 24 is driven by a drive means which, in this form of the invention, comprises a variable speed electric motor 28 operably coupled with a gear reduction mechanism 30 (FIG. 1).

A driving sprocket 32 is mounted on an output shaft of the gear reduction means and a driven sprocket 34 is mounted upon shaft 24 (FIG. 1). In order to drive shaft 24 and rotor 20 at a controlled rate of speed, sprocket 34 is interconnected to sprocket 32 by an endless drive chain 36.

Referring now to FIG. 3, a transversely extending reciprocally movable blade or barrier member 38 extends from the exterior of hopper 14 through slot 18 and into the hopper 14. Member 38 has a thickness less than the width of slot 18, has an external edge portion 40, and an internal end portion 42. Operably interconnected with member 38 are means for reciprocating the member so that as rotor 20 rotates, internal edge portion 42 of member 38 is continuously maintained in close proximity with the side walls of rotor 20. With this arrangement, as the rotor 20 rotates, the material within the hopper will be moved into compressive engagement with the bottom surface of member 38 and will be continuously forced out of the hopper between the bottom of slot 18 and the bottom surface of member 38.

In this embodiment of the invention illustrated, the means for reciprocating the barrier member comprises a pair of cam members 44 which are mounted on a transversely extending shaft 46. As shown in FIG. 1, shaft 46 is carried by frame 12 for rotation within suitable bearings 48. Cams 44 are disposed in close proximity with hopper 14 and the external end portions 40 of member 38 are operably associated with the cam member 44 in a manner presently to be described. As best seen in FIG. 2, end portions 40 of blade member 38 are provided with rearwardly protruding fingers 50 adapted to rotatably carry cam following rollers 52. Rollers 52 extend outwardly from fingers 50 and are connected thereto in the manner shown by means of fasteners 54.

As best seen in FIG. 3, each cam member 44 is generally heart-shaped and is provided with a continuous heart-shaped groove 44a within which rollers 52 travel as the cam members rotate. Shaft 46, upon which cam members 44 are mounted, is rotated by means of a chain 56 which interconnects a driving sprocket 58 mounted on shaft 24 and a driven sprocket 60 mounted on shaft 46. With this construction shaft 46 and cams 44 are synchronously driven with shaft 24 and the design of the cams is such that as cams 44 rotate the inner edge 42 of blade member 38 will be continuously maintained in close proximity with the side walls of rotor 20 as the latter rotates within hopper 14. To insure smooth reciprocal movement of member 38, guide rods 61 are provided at each edge thereof. These guide rods extend rearwardly (to the right in FIG. 2) and are closely received within bores formed in elongated guide members 62.

Referring again to FIG. 3, adjustably connected to the bottom portion of hopper 14 is an L-shaped channel 64. Channel 64 is vertically adjustable relative to the lower surface of blade 38 and, in this form of the invention, comprises means for adjusting the effective width of the slot through which the pliant material is extruded. In this way the thickness of the sheeted material can be regulated. Mounted directly on frame 12 directly below the opening defined by the lower portion of blade 38 and the top leg of channel 64 (which comprises the slot through which the material is extruded) is a conveyor means for receiving the sheeted material passing through the slot and for carrying it forwardly of the apparatus. In this embodiment of the invention the conveyor means comprises an endless belt 66 which passes about and is driven by a roller 68 mounted on a shaft 70. As best seen in FIG. 1, shaft 70 is rotated by means of a sprocket 72 which is driven by a chain 74 which passes around a driving sprocket 76 mounted on shaft 24. With this arrangement conveyor belt 66 will also be driven synchronously with shaft 24. As shown in FIG. 3, the conveyor means is preferably disposed at an angle with respect to the horizontal so that the sheeted material may be carried upwardly and forwardly of the apparatus for introduction into a cooperating apparatus such as a cutter, stamper, or the like.

In operating the apparatus of the invention, hopper 14 is kept continually filled with the material to be extruded as, for example, a masa dough. As a rotor 20 rotates within hopper 14, in a clockwise direction, the material will be moved to the left and upwardly between one wall of the rotor and the curved bottom wall 14c of the hopper. When the pliant material is moved into the space designated by the letter "A" in FIG. 3, it will be compressed against the lower surface of barrier 38 and substantially all of the material will be forced through the slot defined by the lower surface of member 38 and the upper surface of leg 64a of channel 64. The sheeted "D" dough will then fall by force of gravity uniformly downwardly onto belt 66 of the conveyor means for transport forwardly of the apparatus.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

We claim:

1. A material extruding apparatus for extruding pliant material into a relatively thin, continuous sheet comprising:
   (a) a material receiving hopper having spaced apart side walls one of which has an elongated slot formed therein;
   (b) a barrier member having a thickness less than the width of the slot in said side wall and extending from outside said hopper through said slot into said hopper; said member having an edge portion disposed within said hopper;

(c) material moving means rotatably mounted within said hopper in cooperative association with said barrier member, for moving the material within the hopper into compressive engagement with the portion of said barrier member disposed within said hopper, said material moving means comprising an elongated rotor having a plurality of interconnected side walls; and (d) means interconnected with said barrier member for reciprocating said member within said slot relative to said rotor so that as said rotor rotates, said internal edge portion of said barrier member will be continuously maintained in close proximity with said side walls of said material moving means without touching same whereby a substantial majority of the material moved into compressive engagement with said barrier member will be extruded from said hopper through the slot in said side wall to form a relatively thin continuous sheet of material.

2. A material extruding apparatus as defined in claim 1 which includes a curved bottom wall interconnecting said side walls and in which said material moving means comprises a rotatable rotor having at least three interconnected side walls defining at their juncture at least three edge portions, said rotor being positioned within said hopper so that as said rotor rotates said edge portions continuously sweep along said bottom wall of said hopper in close proximity therewith.

3. A material extruding apparatus for extruding pliant material into a thin continuous sheet comprising:
(a) a frame;
(b) a material receiving hopper mounted on said frame comprising:
 (1) spaced apart side walls; one of said walls having a transversely extending slot therein; and
 (2) a curved bottom wall interconnecting said side walls;
(c) a rotor mounted for rotation within said hopper, said rotor having at least three interconnected side walls defining at their juncture at least three edge portions, said rotor being positioned within said hopper so that as said rotor rotates said edge portions continuously sweep along said curved bottom wall in close proximity therewith;
(d) drive means operatively associated with said rotor for rotating said rotor;
(e) a reciprocally movable member extending from outside said hopper, through said slot and into said hopper, said member having an external edge portion and an internal edge portion;
(f) means for reciprocating said member so that as said rotor rotates, said internal edge portion of said member is continuously maintained in close proximity with said side walls of said rotor, whereby as said rotor rotates material within said hopper will be moved into compressive engagement with said reciprocally movable member and a substantial portion thereof will be extruded from the hopper through said slot to form a thin continuous sheet of material.

4. A material extruding apparatus as defined in claim 3 in which said means for reciprocating said member comprises at least one cam member rotatably mounted on said frame proximate said hopper, said external edge portion of said member being operably associated with said cam member.

5. A material extruding apparatus as defined in claim 4, including a cam follower member rotatably mounted on said external edge portion of said reciprocating member, said cam member being provided with a continuous groove adapted to closely receive said cam follower member.

6. A material extruding apparatus as defined in claim 4, in which said means for driving said rotor comprises an electric motor mounted on said frame and in which said cam member is synchronously driven with said rotor by said electric motor.

7. A material extruding apparatus as defined in claim 3, including conveyor means disposed below said hopper for receiving sheet material passing through said slot and carrying said material forwardly of the apparatus.

8. A material extruding apparatus for extruding pliant material into a continuous sheet comprising:
(a) a material receiving hopper having side walls interconnected by a curved bottom wall; one of said side walls having a slot formed therein;
(b) a rotor mounted for rotation within said hopper, said rotor being substantially triangular in cross-section and having interconnected side walls defining at their juncture at least three edge portions, said rotor being positioned within said hopper so that said edge portions continuously sweep along said bottom wall as said rotor rotates;
(c) a pair of cam members rotatably mounted adjacent said hopper; and
(d) a reciprocally movable member having an upper and lower substantially planar surface extending from outside said hopper, through said slot and into said hopper, one edge of said member being operably interconnected with said cam members and the other edge thereof being maintained by rotation of said cam members in continuous close proximity with said side walls of said rotor as said rotor rotates, whereby as said rotor rotates within said hopper material will be forced into compressive engagement with said lower surface of said reciprocally movable member and will then be forced outwardly through said slot to form a continuous thin sheet of material.

9. A material extruding apparatus as defined in claim 8, in which each of said cam members is provided with a continuous groove and said reciprocally movable member is provided at said one edge with a pair of cam follower members adapted to be received within the grooves in said cam members.

10. An apparatus for extruding masa dough into a thin continuous sheet, comprising:
(a) a dough receiving hopper having spaced apart side walls one of which has an elongated slot formed therein;
(b) a barrier member having an upper and a lower substantially planar surface and a thickness less than the width of the slot in said side wall and extending from outside said hopper through said slot into said hopper; said member having an edge portion disposed within said hopper;
(c) a multisided rotor rotatably mounted within said hopper in cooperative association with said barrier member, for moving the masa dough within the hopper into compressive engagement with said lower surface of said barrier member disposed within said hopper; and (d) means interconnected with said barrier member for reciprocating said member within said slot relative to said rotor so that as said rotor rotates, said internal edge portion of said barrier member will be continuously maintained in close proximity with said sides of said rotor whereby a substantial majority of the masa dough moved into compressive engagement with said barrier member will be extruded from said hopper through the slot in said side wall to form a relatively thin continuous sheet of dough.

11. An apparatus for extruding edible, pliable dough into a continuous sheet, comprising:
(a) a dough receiving hopper including:
  (1) spaced apart side walls; one of said walls having a transversely extending slot therein; and
  (2) a curved bottom wall interconnecting said side walls;
(b) a rotor mounted for rotation within said hopper, said rotor having at least three interconnected side walls defining at their juncture at least three edge portions, said rotor being positioned within said hopper so that as said rotor rotates said edge portions continuously sweep along said curved bottom wall in close proximity therewith;
(c) drive means operatively associated with said rotor for rotating said rotor;
(d) a reciprocally movable substantially planar member extending from outside said hopper, through said slot and into said hopper, said member having an external edge portion and an internal edge portion;
(e) means for reciprocating said member so that as said rotor rotates, said internal edge portion of said member is continuously maintained in close proximity with said side walls of said rotor, whereby as said rotor rotates dough within said hopper will be moved into compressive engagement with said reciprocally movable member and a substantial portion thereof will be extruded from the hopper through said slot to form a thin continuous sheet of dough.

* * * * *